(12) United States Patent
Nishihara et al.

(10) Patent No.: US 7,863,378 B2
(45) Date of Patent: Jan. 4, 2011

(54) THERMOPLASTIC ELASTOMER COMPOSITION AND MODIFIER COMPOSITION USING THE SAME

(75) Inventors: Hajime Nishihara, Tokyo (JP); Toshikazu Hoshina, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 11/513,112

(22) Filed: Aug. 31, 2006

(65) Prior Publication Data

US 2008/0058471 A1 Mar. 6, 2008

(51) Int. Cl.
*C08L 25/08* (2006.01)
*C08L 25/10* (2006.01)
*C08L 25/12* (2006.01)
*C08L 53/02* (2006.01)

(52) U.S. Cl. ............... 525/66; 525/68; 525/69; 525/93; 525/98; 525/99; 525/88; 525/92 J

(58) Field of Classification Search ............ 525/88, 525/92 C, 92 J, 89, 66, 68, 69, 93, 98, 99
See application file for complete search history.

(56) References Cited

U.S. PATENT DOCUMENTS

| | | | |
|---|---|---|---|
| 5,960,851 A * | 10/1999 | Donahue | 164/34 |
| 6,087,431 A | 7/2000 | Uchida et al. | |
| 6,384,143 B1 | 5/2002 | Nishihara et al. | |
| 6,403,716 B1 * | 6/2002 | Nishihara | 525/191 |
| 6,417,271 B1 | 7/2002 | Nishihara et al. | |
| 6,433,089 B1 | 8/2002 | Nishihara et al. | |
| 6,506,839 B1 | 1/2003 | Nishihara et al. | |
| 6,555,624 B2 | 4/2003 | Nishihara et al. | |
| 6,800,693 B2 | 10/2004 | Nishihara et al. | |
| 2003/0083434 A1 * | 5/2003 | Ouhadi et al. | 525/80 |
| 2004/0185288 A1 * | 9/2004 | Peng | 428/515 |
| 2005/0154136 A1 * | 7/2005 | Dharia et al. | 525/192 |

FOREIGN PATENT DOCUMENTS

| | | |
|---|---|---|
| JE | 2006-056962 | 3/2006 |
| JP | 2000-302923 | 10/2000 |
| JP | 2001-158848 | 6/2001 |
| JP | 2002-69252 | 3/2002 |
| JP | 2002-105278 | 4/2002 |
| JP | 2002-146131 | 5/2002 |
| JP | 2002-167472 | 6/2002 |
| JP | 2002-194145 | 7/2002 |
| JP | 2002-348413 | 12/2002 |
| JP | 2003-034738 | 2/2003 |
| JP | 2003-171504 | 6/2003 |
| JP | 2003-523473 | 8/2003 |
| JP | 2003-277619 | 10/2003 |
| JP | 2004-018818 | 1/2004 |
| JP | 2004-067798 | 3/2004 |
| JP | 2004-067944 | 3/2004 |
| JP | 2004-149709 | 5/2004 |
| JP | 2004-285199 | 10/2004 |
| JP | 2004-285200 | 10/2004 |
| JP | 2004-352869 | 12/2004 |
| JP | 2005-036140 | 2/2005 |
| JP | 2006-089563 | 4/2006 |
| JP | 2006-143783 | 6/2006 |
| WO | WO-01/48079 | 5/2001 |
| WO | WO-03/035705 | 5/2003 |

OTHER PUBLICATIONS

Nishihara et al. CAPLUS AN 2004:842247, Oct. 2004.*
Nishihara et al, electronic translation of specification or JP 2004285200, Oct. 2004.*
Nishihara et al., electronic translation of spcification of JP 2005-036140 (Oct. 2005).*

* cited by examiner

*Primary Examiner*—Jeffrey C Mullis
(74) *Attorney, Agent, or Firm*—Birch, Stewart, Kolasch & Birch, LLP

(57) ABSTRACT

A thermoplastic elastomer composition comprising a thermoplastic vulcanized olefin elastomer (A) and an aromatic vinyl random copolymer (B), wherein the (A) component is a thermoplastic vulcanized elastomer composed of an ethylene-α-olefin copolymer (A-1) and a thermoplastic non-vulcanizable polymer (A-2) and the (B) component is a hydrogenated copolymer rubber composed mainly of random bonding which has an olefinic double bond hydrogenation ratio of 50% or more and comprises 10 to 49% by weight of a conjugated diene monomer and 51 to 90% by weight of an aromatic vinyl monomer.

1 Claim, No Drawings

THERMOPLASTIC ELASTOMER COMPOSITION AND MODIFIER COMPOSITION USING THE SAME

CROSS REFERENCE TO RELATED APPLICATION

The present application is based on Japanese Patent Laid-Open No. 2005-232304 (filing date: Feb. 19, 2004) and further related to the following applications; all disclosures including the basic concepts and aspects of the inventions can be incorporated herein by reference.

U.S. Pat. Nos. 6,087,431, 6,417,271, 6,384,143, 6,433,089, 6,403,716, 6,506,839, 6,555,624, and 6,800,693, WO01/48079, and Japanese Patent Laid-Open Nos. 2005-036140, 2004-067798, 2002-167472, 2002-146131, 2002-69252, 2002-194145, 2002-348413, 2003-034738, 2003-171504, 2003-277619, 2004-018818, 2004-067944, 2004-149709, 2004-285199, 2004-285200, 2004-352869, 2006-056962, 2006-089563, 2006-143783, and 2005-157341.

TECHNICAL FIELD

The present invention relates to a thermoplastic elastomer composition and a modifier using the same. More specifically, the invention relates to a thermoplastic elastomer composition excellent in compatibility with a thermoplastic polymer and in rubber characteristics, and to a modifier using the same.

BACKGROUND

It has previously been widely carried out to produce films, sheets, and moldings using thermoplastic polymers, but in most cases a single polymer does not provide physical properties matched with intended use. By way of example, combining a thermoplastic elastomer and a different kind of thermoplastic polymer is expected to provide a material whose rubber characteristics, heat resistance, chemical resistance, and strength are balanced with each other. However, the rubber characteristics and mechanical strength are inferior because these polymers are generally incompatible with each other. Thus, there is a need in the market for a thermoplastic elastomer excellent in rubber characteristics and mechanical strength.

Use of various modifier compositions is known as a conventional technology for compatibilizing such a thermoplastic elastomer with a different kind of thermoplastic polymer such as ABS resin. For example, there are known a composition comprising an olefin elastomer and a styrene random copolymer with a styrene content of 60 to 90% by weight (WO2003/35705), a composition comprising a thermoplastic vulcanized olefin elastomer, and a block copolymer having a thermoplastic block composed of a block copolymer having an aromatic vinyl block and a conjugated diene block or a hydrogenated product thereof and a thermoplastic polyurethane (Japanese Patent Laid-Open No. 2004-285200), a composition comprising an olefin polymer, a styrene block polymer containing a block copolymer having a block consisting mainly of an aromatic vinyl compound and a conjugated diene block or a hydrogenated product thereof, and a block copolymer having a thermoplastic block composed of a block copolymer having an aromatic vinyl block and a conjugated diene or a hydrogenated product thereof and a thermoplastic polyurethane (Japanese Patent Laid-Open No. 2002-105278), and a hydrogenated copolymer composed of an olefin polymer, an aromatic vinyl compound, and a conjugated diene, wherein the aromatic vinyl compound has a block or random structure (Japanese Patent Laid-Open No. 2000-302923). However, these compositions are not sufficient in compatibility with a different kind of thermoplastic polymer such as ABS resin and in rubber characteristics, and therefore not always satisfactory in the market.

SUMMARY

With the foregoing current circumstances in view, the present invention has as an object the provision of a thermoplastic elastomer composition free of the above-described problems that is, excellent in compatibility with a thermoplastic polymer and in rubber characteristics, and a modifier using the same.

As a result of intensive studies for improving a thermoplastic elastomer, the present inventor has found that the compatibility with a thermoplastic polymer and rubber characteristics thereof are dramatically improved by using a particular thermoplastic vulcanized olefin elastomer and a particular aromatic vinyl random copolymer.

Thus, the present invention provides a thermoplastic elastomer composition comprising a thermoplastic vulcanized olefin elastomer (A) and an aromatic vinyl random copolymer (B) wherein the (A) component is a thermoplastic vulcanizable elastomer composed of an ethylene-α-olefin copolymer (A-1) and a thermoplastic non-vulcanizable polymer (A-2) and the (B) component is a hydrogenated copolymer rubber composed mainly of random bonding which has an olefinic double bond hydrogenation ratio of 50% or more and consists of 10 to 49% by weight of a conjugated diene monomer and 51 to 90% by weight of an aromatic vinyl monomer, particularly a thermoplastic elastomer composition further containing a block copolymer (D) having a thermoplastic block (1) composed of either a block copolymer having an aromatic vinyl block and a conjugated diene block or a hydrogenated product thereof and a thermoplastic block (2) of a thermoplastic polymer (C) containing one or more functional groups selected from the group consisting of oxygen-, nitrogen-, and sulfur-containing functional groups, and a modifier composition using the same for the thermoplastic polymer (C) containing functional groups selected from oxygen-, nitrogen-, and sulfur-containing groups.

The invention is described below in detail.

The composition of the invention is a composition comprising a particular thermoplastic vulcanized olefin elastomer (A) and a particular aromatic vinyl random copolymer (B).

Here, it is important that the (A) component be vulcanized while maintaining thermoplasticity. The component is excellent in rubber characteristics and heat resistance because the stable morphology thereof is maintained even under high shear through the vulcanization.

In addition, it is important that the component (B) be composed mainly of aromatic vinyl monomer units in terms of a proportion in the composition and composed mainly of random bonding as a bonding style. Satisfying these conditions improves the compatibility with a different kind of thermoplastic polymer based on the repulsive effect of the random copolymer.

Then, the inventor has found that the simultaneous presence of the (A) and (B) components results in the appearance of outstanding compatibility and rubber characteristics which are not predictable from the case that they are present alone, thereby accomplishing the invention.

The components according to the invention are described below in detail.

(A) Component

According to the invention, (A) is a thermoplastic vulcanized elastomer composed of an ethylene-α-olefin copolymer (A-1) and a thermoplastic non-vulcanizable polymer (A-2).

The (A-1) component according to the invention is an ethylene-α-olefin copolymer, and preferably a copolymer of ethylene and a 3C to 20C α-olefin. Examples of the α-olefin include propylene, butane-1, pentene-1, hexane-1,4-methylpentene-1, heptene-1, octane-1, nonene-1, decene-1, undecene-1, and dodecene-1. Among others, hexane-1,4-methylpentene-1, and octane-1 are preferable; particularly preferred are 3C to 12C α-olefins, most preferably propylene, butene-1, and octene-1.

In addition, the (A-1) component may optionally contain a monomer having unsaturated bonding; examples thereof include conjugated diolefins such as butadiene and isoprene, non-conjugated diolefins such as 1,4-hexadiene, cyclic diene compounds such as dicyclopentadiene and norbornene derivatives, and acetylenes. Among others, ethylidene norbornene (ENB) and dicyclopentadiene (DCP) are most preferable.

Further, the (A-1) component preferably has a glass transition temperature (Tg) of $-10°$ C. or less.

Furthermore, the (A) component preferably has a Mooney viscosity (ML) (according to ISO 289-1985 (E)) of 20 to 150, more preferably 50 to 120 as determined at 100° C.

The (A-1) component according to the invention is preferably produced using a known metallocene catalyst.

A metallocene catalyst is generally composed of a cyclopentadienyl derivative of group IV metal such as titanium or zirconium, and a co-catalyst. The metallocene catalyst not only is highly active as a polymerization catalyst, but also provides a polymer having a narrow molecular weight distribution and a copolymer having a uniform distribution of a 3C to 20C α-olefin as the comonomer, compared to Ziegler catalyst.

The (A-1) component used in the invention preferably has a copolymerization ratio of an α-olefin of 1 to 60% by weight, more preferably 10 to 50% by weight, most preferably 20 to 45% by weight. The copolymerization ratio of an α-olefin is preferably 60% by weight or less in view of the hardness, tensile strength and the like of the composition while being preferably 1% by weight or more in view of the flexibility and mechanical strength thereof.

The density of the (A-1) component is preferably in the range of 0.8 to 0.9 $g/cm^3$. An ethylene-α-olefin copolymer having this range of density can be used to provide a thermoplastic elastomer composition of the invention excellent in flexibility and rubber characteristics.

The (A-1) component in the (A) component used in the invention desirably has long-chain branching. The presence of long-chain branching enables the density to be decreased compared to the proportion (% by weight) of the copolymerized α-olefin, without reducing the mechanical strength, and can provide an ethylene-α-olefin copolymer having low density, low hardness, and high strength. Examples of the ethylene-α-olefin copolymer having long-chain branching include that described in U.S. Pat. No. 5,278,272 specification or the like.

In addition, the (A-1) component preferably has a melting point peak at room temperature or higher in a differential scanning calorimeter (DSC). When having a melting point peak, the (A-1) component has a stable morphology in the temperature range of the melting point or lower, and is excellent in handleability and less sticky.

Further, the (A-1) component preferably has a melt index ranging from 0.01 to 100 g/10 minutes (190° C., 2.16 kg load (0.212 Pa)), more preferably from 0.2 to 10 g/10 minutes. Not more than 100 g/10 minutes is preferable in view of the vulcanizability of the thermoplastic elastomer composition of the invention, and not less than 0.01 g/10 minutes is preferable in view of the flowability and processibility thereof.

According to the invention, the content rate of a polymer having a molecular weight of 150,000 or less in polystyrene equivalent in the (A-1) component is preferably 30% by weight or less, more preferably 25% by weight or less, still more preferably 20% by weight or less, most preferably 15% by weight or less, extremely preferably 10% by weight or less. When the content rate is 30% by weight or less, the vulcanizability thereof is significantly enhanced and the mechanical strength, appearance, touch, abrasion resistance, and oil resistance are improved.

According to the invention, methods for controlling the content rate of a polymer having a molecular weight of 150,000 or less in polystyrene equivalent in the vulcanizable elastomer (A) include a method involving increasing the total molecular weight so that the content rate of the part having a molecular weight of 150,000 or less reaches 30% or less, a method involving removing the part having a molecular weight of 150,000 or less by an operation such as extraction, and a method for polymerization comprising selectively avoiding the generation of the part having a molecular weight of 150,000 or less using a polymerization catalyst or the like.

According to the invention, the degree of vulcanization derived from the xylene-insoluble component of the (A-1) component is preferably 10% or more, more preferably 30% or more, most preferably 70% or more. When the degree is in the above-described range, excellent rubber characteristics are exhibited.

The above-described (A-2) component of the (A) component according to the invention is a thermoplastic non-vulcanizable polymer, and may be a rubber-like polymer or a resin polymer.

The (A-2) component is non-vulcanizable, but a thermoplastic, slightly vulcanized polymer is not precluded if it is thermoplastic. By way of example, it comprises at least one thermoplastic non-vulcanizable polymer selected from a thermoplastic polymer (C) containing functional groups selected from oxygen-, nitrogen- and sulfur-containing groups, an olefin resin, and an aromatic vinyl resin. The (C) component is equivalent to those mentioned in detail in a section of "(C) component" to be described.

A preferred olefin resin as (A-2) component includes, for example, a copolymer resin containing ethylene and/or α-olefins having 2 to 20 carbon atoms, such as an ethylene or propylene resin. Particularly, a propylene resin is preferable.

Specific examples of the propylene resin most suitably used in the invention include a homoisotactic polypropylene and an isotactic copolymer resin (including block or random) of propylene and another α-olefin such as ethylene, butene-1, pentene-1, or hexene-1.

A random copolymer resin of propylene as main component with an α-olefin, one of olefin resins as (A-2) component, can be produced by a high-pressure method, a slurry method, a gas phase method, a bulk method, a solution method, or the like; a Ziegler-Natta, single-site or metallocene catalyst is preferable as a polymerization catalyst. When narrow distributions of composition and molecular weight are particularly required, a random copolymerization method using a metallocene catalyst is preferable.

The olefin resin suitably used in the invention preferably has a melt flow rate ranging from 0.1 to 100 g/10 minutes (230° C., 2.16 kg load (0.212 Pa)). Not more than 100 g/10 minutes is preferable in view of the heat resistance and mechanical strength of the thermoplastic elastomer composition; not less than 0.1 g/10 minutes is preferable in view of the flowability and processability.

A preferred aromatic vinyl resin as (A-2) component includes rubber-modified resins such as impact-resistant polystyrene and/or rubber-unmodified resins such as polystyrene.

The rubber-modified resin refers to a polymer consisting of a rubber-like polymer dispersed in the form of particles in a matrix composed of a vinyl aromatic polymer. This polymer is obtained by adding an aromatic vinyl monomer and optionally a vinyl monomer copolymerizable therewith in the presence of a rubber-like polymer and subjecting the monomer mixture to known bulk polymerization, bulk suspension polymerization, solution polymerization or emulsion polymerization. A typical example is impact-resistant polystyrene or the like.

Here, the rubber-like polymer preferably has a glass transition temperature (Tg) of −30° C. or lower because the impact resistance is enhanced.

Examples of such rubber-like polymers include diene rubbers such as polybutadienes, poly(styrene-butadiene)s, and poly(acrylonitrile-butadiene)s; saturated rubbers obtained by hydrogenating the above-exemplified diene rubbers; isoprene rubber; chloroprene rubber; acrylic rubbers such as polybutyl acrylates; and ethylene-propylene-diene monomer ternary copolymers (EPDM). The diene rubbers are particularly preferable.

The composition (A) composed of the (A-1) and (A-2) components according to the invention consists of 1 to 99% by weight, more preferably 10 to 80% by weight, most preferably 20 to 70% by weight of the (A-1) component and 1 to 99% by weight, more preferably 90 to 20% by weight, most preferably 80 to 30% by weight of the (A-2) component based on 100% by weight of the composition (A). Within the above ranges, the balance of rubber characteristics and compatibility is improved.

According to the invention, the (A) composition composed of the (A-1) and (A-2) components may be prepared by melt mixing separate (A-1) and (A-2) using an extruder, or may be a thermoplastic polymerization-type resin composition obtained by producing (A-1) and (A-2) during polymerization. A polymerization-type olefin composition as a typical example of such a polymerization-type composition is a thermoplastic elastomer produced by a polymerization method, composed of the dispersion phase of an olefin rubber and the continuous phase of an olefin resin. The production is typically carried out by a multi-stage polymerization method.

For the purpose of the invention, the multi-stage polymerization method refers to a polymerization method which can continuously produce plural kinds of polymers by not completing polymerization by once but performing a two or more stage polymerization. This is a technique different from a conventional polymer blending method which involves obtaining a mixed resin composed of different polymers using a mechanical procedure.

The polymerization-type olefin composition obtained by the multi-stage polymerization method is a copolymer obtained by multi-stage polymerizing a hard segment (1) and a soft segment (2) in two or more steps in a reactor. The hard segment (1) is typically a propylene homopolymer block or a block of a copolymer of propylene with an α-olefin. Examples thereof include a block of a binary or ternary copolymer such as propylene/ethylene, propylene/1-butene, or propylene/ethylene/1-butene. The soft segment (2) is typically an ethylene homopolymer block or a block of a copolymer of ethylene with an α-olefin. Examples thereof include a block of a binary or ternary copolymer such as ethylene/propylene, ethylene/1-butene, or ethylene/propylene/1-butene.

The composition (A) may optionally contain a thermoplastic vulcanized rubber-like polymer other than the (A-1) component. Examples thereof include thermoplastic vulcanized rubber-like polymers such as diene rubbers (e.g., polybutadienes, poly(styrene-butadiene)s, poly(styrene-isoprene)s, and poly(acrylonitrile-butadiene)s); isoprene rubber; chloroprene rubber; and acrylic rubbers (e.g., polybutyl acrylates). Poly(styrene-butadiene) and poly(styrene-isoprene) rubbers are particularly preferable, and their stereoregularity may be that of block or random. They may optionally contain component (B) to be described.

(B) Component

According to the invention, the aromatic vinyl random copolymer (B) is a hydrogenated copolymer rubber composed mainly of random bonding which has an olefinic double bond hydrogenation ratio of 50% or more and consists of 10 to 49% by weight of a conjugated diene monomer and 51 to 90% by weight of an aromatic vinyl monomer, and may be optionally copolymerized with a monomer copolymerizable with a conjugated diene, such as an olefin, methacrylic acid ester, acrylic acid ester, unsaturated nitrile or vinyl chloride monomer.

Examples of the conjugated diene monomer include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene; 1,3-butadiene, isoprene, and 1,3-pentadiene are preferable, and 1,3-butadiene and isoprene are most preferable.

Examples of the aromatic vinyl monomer include styrene, α-methylstyrene, p-methylstyrene, t-butylstyrene, divinylbenzene, N,N-dimethyl-p-aminoethylstyrene, and vinylpyridine; styrene and α-methylstyrene are preferable. These aromatic monomers may be used alone or in a combination of two or more kinds. The aromatic vinyl monomer content is 51 to 90% by weight, preferably 51 to 80% by weight, more preferably 51 to 70% by weight.

In the (B) component, the vinyl bond of the conjugated diene monomer part before hydrogenation may be uniformly present in the molecule or may be increased or decreased in density along the molecular chain, and plural blocks different in the content of vinyl bond may be contained. When an aromatic vinyl monomer or a monomer copolymerizable with the above conjugated diene monomer is contained, the monomer preferably is randomly bound in the conjugated diene monomer part, but a block polymer formed of only the aromatic vinyl monomer or another monomer may be also contained. The content of the block-like aromatic vinyl polymer is preferably 20% by weight or less, more preferably 10% by weight or less based on the total aromatic vinyl monomers.

The olefinic double bonds in the (B) component are hydrogenated in an amount of 50% or more, preferably 90% or more, more preferably 95% or more based on the total double bonds, and the amounts of the remaining double bonds in the main and side chains preferably are each 5% or less. Specific examples of such rubbers include a rubber-like polymer obtained by partially or completely hydrogenating a diene rubber such as polybutadiene, poly(styrene-butadiene), poly(acrylonitrile-butadiene), polyisoprene, or polychloroprene. A hydrogenated butadiene or hydrogenated isoprene rubber is particularly preferable.

The (B) component is obtained by subjecting the above-described rubber to partial hydrogenation using a known hydrogenation method. Examples thereof can include a method for hydrogenation using a triisobutylborane catalyst as described in F. L. Ramp, et al., J. Amer. Chem. Soc., 83: 4672 (1961), a method for hydrogenation using toluenesulfonylhydrazide as described in Hung Yu Chen, J. Polym. Sci. Polym. Letter Ed., 15: 271 (1977), and a method for hydrogenation using an organocobalt-organoaluminum catalyst or an organonickel-organoaluminum catalyst as described in Japanese Patent Publication No. 42-8704. A particularly preferred hydrogenation method is a method using a catalyst capable of hydrogenation under gentle conditions of low temperatures and low pressures as disclosed in Japanese Patent Laid-Open Nos. 59-133203 and 60-220147, or a method which comprises contacting the rubbers with hydrogen in an inert organic solvent in the presence of a catalyst comprising a bis(cyclopentadienyl)titanium compound and a hydrocarbon compound having sodium atom, potassium atom, rubidium atom or cesium atom as disclosed in Japanese Patent Laid-Open No. 62-207303.

The (B) component preferably has a 5% by weight styrene solution viscosity (5% SV) ranging from 20 to 300 centipoises (cps) at 25° C. A particularly preferable range is 25 to 150 cps. The proportion of the (A) component is preferably 1 to 99 parts by weight, more preferably 10 to 90 parts by weight, most preferably 20 to 80 parts by weight based on the total 100 parts by weight of the (A) and (B) components.

(C) Component

According to the invention, the (C) component is a thermoplastic polymer containing functional groups selected from oxygen-, nitrogen- and sulfur-containing groups, and may be an elastomer or a resin. The oxygen-, nitrogen- and sulfur-containing groups are, for example, a carbonate group, an ester group, an amino group, an amide group, a urethane group, a nitrile group, an ether group, a hydroxyl group, an epoxy group, a ketone group, an aldehyde group, a carboxylic acid group, an acid anhydride group, a ketene group, and a mercapto group.

Examples of the (C) component include a polyurethane, polystyrene, polyphenylene ether, polyalkylene ether, polyolefin, polyvinyl chloride, polyamide, polyester, polyphenylene sulfide, polycarbonate, or polymethacrylate polymer, or a mixture of two or more kinds. Among others, a thermoplastic polyurethane and/or a polymer composed of an unsaturated nitrile monomer unit and an aromatic vinyl monomer unit, a polyphenylene ether, and a polycarbonate are preferable.

The thermoplastic polyurethane preferable as a (C) component is produced by the reaction of a high molecular diol, an organic diisocyanate, and a chain extender. Examples of the high molecular diol include polyesterdiols, polyetherdiols, polyesteretherdiols, polycarbonatediols, and polyestercarbonatediols. Examples of the organic diisocyanate include aromatic diisocyanates, alicyclic diisocyanates, and aliphatic diisocyanates. Examples of the chain extender include aromatic diols, alicyclic diols, and aliphatic diols. For improving the light stability, the selection of the configuration of the organic diisocyanate is important; alicyclic diisocyanates and aliphatic diisocyanates are preferable.

Another thermoplastic polymer preferable as a (C) component is a polymer composed of an unsaturated nitrile monomer unit and an aromatic vinyl monomer unit. The polymer is preferably a copolymer with an unsaturated nitrile monomer such as acrylonitrile or methacrylonitrile, an acrylic or methacrylic ester comprising a 1C to 8C alkyl group, or a monomer such as acrylic acid, methacrylic acid, maleic anhydride, or N-substituted maleimide, which contains as an essential component an aromatic vinyl monomer such as styrene, α-methylstyrene, para-methylstyrene, or halogenated styrene. The polymer can be optionally modified by rubber, and is preferably a rubber-modified polymer obtained by dispersing a rubber-like polymer in the form of particles in the matrix of the above-described polymer.

Examples of the rubber-modified polymer include ABS resin (acrylonitrile-butadiene-styrene copolymer), AAS resin (acrylonitrile-acrylic rubber-styrene copolymer), and AES resin (acrylonitril-ethylene propylene rubber-styrene copolymer).

Another thermoplastic polymer preferable as a (C) component is a polyphenylene ether. Preferred examples thereof include poly(2,6-dimethyl-1,4-phenylene ether) and a copolymer of 2,6-dimethylphenol and 2,3,6-trimethylphenol; among others, poly(2,6-dimethyl-1,4-phenylene ether) is particularly preferable. A method for producing the (C) component is not particularly restricted. It can be easily produced by using a complex of a cuprous salt and an amine as a catalyst according to a method described in U.S. Pat. No. 3,306,874 specification, for example, to subject 2,6-xylenol to oxidation polymerization. Alternatively, it can be easily produced by a method described in U.S. Pat. Nos. 3,306,1075, 3,257,357 or 3,257,358, Japanese Patent Publication No. 52-17880, or Japanese Patent Laid-Open No. 50-51197. The above-described polyphenylene ether used in the invention preferably has a reduced viscosity ηsp/C (0.5 g/dl, chloroform solution, measurement at 30° C.) of 0.20 to 0.70 dl/g, more preferably 0.30 to 0.60 dl/g.

(D) Component

According to the invention, the (D) component may be optionally contained for improving the compatibility and dispersibility of the (A), (B) and (C) components. The (D) component is a block copolymer having a thermoplastic block (1) composed of a block copolymer having an aromatic vinyl block and a conjugated diene block, or a hydrogenated product thereof, and a thermoplastic block (2) of a polymer having functional groups selected from oxygen-, nitrogen- and sulfur-containing groups; particularly, the oxygen-, nitrogen- or sulfur-containing groups are functional groups selected from a carbonate group, an ester group, an amino group, an amide group, a urethane group, a nitrile group, an ether group, a hydroxyl group, an epoxy group, a ketone group, an aldehyde group, a carboxylic acid group, an acid anhydride group, a ketene group, and a mercapto group. Here, the functional group is preferably contained in repeating units.

A particularly preferable block copolymer as (D) component has a thermoplastic block (1) which is a block copolymer composed of an aromatic vinyl unit and a conjugated diene unit, or a block copolymer having the above-described conjugated diene unit part partially hydrogenated or optionally modified by an unsaturated carboxylic acid or its anhydride or an epoxy compound.

The block structure of the thermoplastic block (1) is preferably a linear block copolymer represented by SB, S(BS)n (where n is an integer of 1 to 3) or S(BSB)n (where n is an integer of 1 to 2), or a star block copolymer shown by (SB)nX (where n is an integer of 3 to 6 and X is a residue of a coupling agent such as silicon tetrachloride, tin tetrachloride or a polyepoxy compound) in which the B portion is a bonding center, with a proviso that the polymer block composed of the aromatic vinyl unit is expressed by S and the polymer block composed of the conjugated diene unit and/or the partially hydrogenated conjugated diene unit is expressed by B. Among them, preferred are linear block copolymers of diblock SB, triblock SBS and tetrablock SBSB.

The aromatic vinyl monomer constituting the above block copolymer is, for example, styrene, α-methylstyrene, para-methylstyrene, p-chlorostyrene, p-bromostyrene, or 2,4,5-tribromostyrene; styrene is most preferred, but styrene as a main component may be copolymerized with another aromatic vinyl monomer mentioned above.

Examples of the conjugated diene monomer constituting the block copolymer include isoprene, butadiene, hexadiene, 2,3-dimethyl-1,3-butadiene, and 1,3-butadiene. Particularly preferred is 1,3-butadiene and/or isoprene.

The thermoplastic block (2) of the (D) component is particularly preferably a thermoplastic polyurethane or an aromatic polycarbonate. The thermoplastic polyurethane is produced by the reaction of a high molecular diol, an organic diisocyanate, and a chain extender. Examples of the high molecular diol include polyesterdiols, polyetherdiols, polyesteretherdiols, polycarbonatediols, and polyestercarbonatediols. Examples of the organic diisocyanate include aromatic diisocyanates, alicyclic diisocyanates, and aliphatic diisocyanates. Examples of the chain extender include aromatic diols, alicyclic diols, and aliphatic diols. For improving the light stability, the selection of the configuration of the organic diisocyanate is important; alicyclic diisocyanates and aliphatic diisocyanates are preferable.

The block structure of the above (D) component may be a diblock copolymer having one thermoplastic block (1) and one thermoplastic block (2) or a block copolymer in which a total of 3 or 4 or more of the above blocks (1) and (2) are bound, but is preferably the diblock copolymer in view of the compatibility of (A) and (B).

A method for producing the (D) component according to the invention is not particularly restricted, but is produced by a method disclosed in Japanese Patent Laid-Open No. 11-302495, 2002-105278, or 2002-179906. By way of example, it can be produced by kneading a thermoplastic block (1) having a functional group such as hydroxyl, amino, isocyanate, ester, amide, carboxyl, epoxy, thiol, or thioester, and a thermoplastic block (2) under melting conditions.

According to the invention, the proportion of the (D) component is preferably 1 to 100 parts by weight, more preferably 1 to 50 parts by weight, most preferably 2 to 30 parts by weight based on the total 100 parts by weight of the (A) and (B) components.

(E) Component

The (A) component according to the invention may be optionally vulcanized using a vulcanizing agent (E). The (E) component contains a vulcanizing initiator (E-1) as an essential component and optionally contains a polyfunctional monomer (E-2) and a monofunctional monomer (E-3). The proportion of the above (E) component is 0.001 to 10 parts by weight, preferably 0.005 to 3 parts by weight based on 100 parts by weight of (A-1). Within the above range, the rubber characteristics of the composition are improved.

Here, examples of the vulcanizing initiator (E-1) include radical initiators such as organic peroxides and organic azo compounds. Specific examples thereof include: peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, and n-butyl-4,4-bis(t-butylperoxy)valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)diisopropylbenzene, 2,5-dimethyl-2,5-bis(t-butylperoxy)hexane, and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, and m-toluoyl peroxide; peroxy esters such as t-butylperoxy acetate, t-butylperoxy isobutyrate, t-butylperoxy-2-ethyl hexanoate, t-butylperoxy laurate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate, and cumylperoxy octate; and hydroperoxides such as t-butyl hydroperoxide, cumene hydroperoxide, diisopropylbenzene hydroperoxide, 2,5-dimethylhexane-2,5-dihydroperoxide, and 1,1,3,3-tetramethylbutyl peroxide.

Of these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The above-described (E-1) component is preferably used in an amount of 1 to 80% by weight, more preferably 10 to 50% by weight based on the (E) component. Within the above range, the mechanical strength is improved.

According to the invention, the polyfunctional monomer (E-2) as one of the vulcanizing agents (E) preferably has radical polymerizable functional groups as functional group, and the functional group is particularly preferably a vinyl group. The number of the functional groups is two or more, and it is particularly effective to use (E-2) having three or more functional groups in combination with the (E-3) component. Preferred examples of the polyfunctional monomer used include divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylenebismaleimide, diallyl phthalate, tetraallyloxyethane and 1,2-polybutadiene. Triallyl isocyanurate is particularly preferred. These polyfunctional monomers may also be used in combination of plural kinds.

The above (E-2) component is preferably used in an amount of 1 to 80% by weight, more preferably 10 to 50% by weight based on the (E) component. Within the above range, the mechanical strength is improved.

The above-mentioned (E-3) component used in the invention is a vinyl monomer which is added for controlling the vulcanizing reaction rate, preferably a radical polymerizable vinyl monomer. Examples thereof include aromatic vinyl monomers; unsaturated nitrile monomers such as acrylonitrile and methacrylonitrile; ester monomers such as acrylic ester monomers and methacrylic ester monomers; unsaturated carboxylic monomers such as acrylic acid monomer, methacrylic acid monomer; unsaturated carboxylic anhydrides such as maleic anhydride monomer; and N-substituted maleimide monomers.

The (E-3) component is preferably used in an amount of 1 to 80% by weight, more preferably 10 to 50% by weight based on the (E) component. Within the range, the mechanical strength is improved.

According to the invention, the most preferable combination of the vulcanizing agents (E) is a combination of 2,5-dimetyl-2,5-bis(t-butylperoxy)hexane or 2,5-dimethyl-2,5-bis(t-butylperoxy)hexyne-3 as a vulcanizing initiator and triallyl isocyanurate as a polyfunctional monomer, which is excellent in mechanical strength and, when a softener described later is present, retention of the softener.

The (A) component according to the invention may optionally contain a softener. The softener is preferably a process oil composed of a hydrocarbon such as a paraffinic, naphthenic, or aromatic hydrocarbon. Particularly preferred is a process oil composed mainly of a paraffinic hydrocarbon or, in view of compatibility with rubber, a naphthenic hydrocarbon. In view of heat and light stability, the content of the aromatic hydrocarbon in the process oil is preferably 10% or less, more preferably 5% or less, most preferably 1% or less in terms of a carbon number ratio as prescribed in ASTM D2140-97.

The softener component is used in an amount of 5 to 500 parts by weight, preferably 10 to 150 parts by weight based on 100 parts by weight of the (A-1) component for adjusting the hardness and flexibility of the composition. Within the above range, the flexibility, processability and oil bleed resistance are improved.

According to the invention, when abrasion resistance and suppressed shearing heat generation at vulcanization are required, there may be optionally added a polyorganosiloxane having a kinematic viscosity of 5,000 centistokes ($5\times10^{-3}$ m2/sec) or more at 25° C. as specified by JIS-K2410.

The polyorganosiloxane is not particularly restricted, provided that it is in the state of from viscous starch syrup to gum and is a polymer containing siloxane units substituted with an alkyl, vinyl and/or aryl group. Polydimethylsiloxane, among others, is most preferable.

The kinematic viscosity (25° C.) of the polyorganosiloxane used in the invention is 5,000 cs ($5\times10^{-3}$ m2/sec) or more, more preferably 10,000 cs ($1\times10^{-2}$ m2/sec) to less than 10,000,000 (10 m2/sec), most preferably 50,000 cs (0.05 m2/sec) to less than 2,000,000 cs (2 m2/sec).

According to the invention, the addition amount of polyorganosiloxane is preferably 0.01 to 20 parts by weight, more preferably 0.1 to 10 parts by weight, most preferably 0.5 to 5 parts by weight based on 100 parts by weight of the (A) component.

According to the invention, an olefin wax may be optionally added.

The wax is composed of ethylene and a 3C to 20C α-olefin, and preferably produced using a metallocene catalyst. The wax preferably has a weight average molecular weight (Mw) of 3,000 to 20,000, more preferably 3,000 to 15,000, most preferably 5,000 to 10,000 as calculated by gel permeation chromatography (GPC), and a number average molecular weight (Mn) of 500 to 10,000, more preferably 500 to 8,000, most preferably 1,000 to 5,000.

According to the invention, the addition amount of olefin wax is preferably 0.01 to 20 parts by weight, more preferably 0.1 to 10 parts by weight, most preferably 0.5 to 5 parts by weight based on 100 parts by weight of the (A) component. Within the range, the balance of rubber characteristics and compatibility is improved.

According to the invention, an elongational viscosity-improving agent may be optionally added.

The elongational viscosity-improving agent is a component for selectively increasing elongational viscosity while limiting an increase in shear viscosity. Examples thereof include branch-containing olefin resins, fluororesins, polyester resins, and polyamide resins; among others, fluororesins are most preferable.

The fluororesin is a resin containing fluorine atoms. Specific examples thereof can include polymonofluoroethylenes, polydifluoroethylenes, polytrifluoroethylenes, polytetrafluoroethylenes, and tetrafluoroethylene/hexafluoropropylene copolymers. In addition, a monomer copolymerizable with the above-described fluorine-containing monomer may be optionally used in combination. Among the fluororesins, polytetrafluoroethylenes are most preferable.

The above fluororesins are preferably resin-modified in view of dispersibility. By way of example, the fluororesin is preferably acrylic resin-modified, and contains an alkyl (meth)acrylate polymer comprising a structural unit composed of an alkyl (meth)acrylate having a 1C to 4C alkyl group. An acrylic resin-modified polytetrafluoroethylene as disclosed in WO02/090440A1 is most preferable because it is very high in the effect of enhancing elongational viscosity while maintaining shear viscosity.

According to the invention, the addition amount of the fluororesin is preferably 0.01 to 20 parts by weight, more preferably 0.1 to 10 parts by weight, most preferably 0.5 to 5 parts by weight based on 100 parts by weight of the (A) component. Within above range, the balance of elongational viscosity and rubber characteristics is improved.

According to the invention, a crystallinity-improving agent may be optionally added.

Typical examples of the crystallinity-improving agent include a crystal nucleating agent classified into a phosphate ester salt, a sorbitol, or a carboxylate salt, and an inorganic filler.

Specific examples of the crystal nucleating agent include sodium 2,2'-methylenebis(4,6-di-t-butylphenyl)phosphate, bis(p-methylbenzylidene)sorbitol, and bis(p-ethylbenzylidene)sorbitol. Specific examples of the above inorganic filler include single substances such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide or complexes thereof (alloy), hydrates of inorganic metal compounds such as aluminum hydroxide, magnesium hydroxide, dolomite, hydrotalcite, zeolite, calcium hydroxide, barium hydroxide, basic magnesium carbonate, zirconium hydroxide and hydrated tin oxide, zinc borate, zinc metaborate, barium metaborate, zinc carbonate, magnesium carbonate, calcium, calcium carbonate, barium carbonate, kaolin, montmorillonite, bentonite, clay, mica, and talc. Among others, preferred are plate-like fillers, and particularly preferred are talc, mica and kaolin.

According to the invention, the addition amount of the crystallinity-improving agent is preferably 0.01 to 20 parts by weight, more preferably 0.1 to 10 parts by weight, most preferably 0.5 to 5 parts by weight based on 100 parts by weight of the (A) component. Within the above range, the balance of rubber characteristics and compatibility is improved.

As another application of the thermoplastic elastomer of the invention, there is the following composition which exhibits very high heat resistance. Thus, the composition is a thermoplastic elastomer composition containing a thermoplastic vulcanized olefin elastomer (A) composed of an ethylene-α-olefin copolymer (A-1) containing ethylene and a 3C to 20C α-olefin, produced using a metallocene catalyst and a thermoplastic non-vulcanizable polymer (A-2) as an olefin resin and/or an aromatic vinyl resin, and a polyphenylene ether (C), wherein an aromatic vinyl block copolymer (F) composed of a block copolymer having an aromatic vinyl block and a conjugated diene block or a hydrogenated product thereof is contained in, and/or after the formation of, the (A) component, and specifically a thermoplastic polymer composition comprising the thermoplastic vulcanized olefin elastomer (A) composed of (A-1) and (A-2), the polyphenylene ether (C), and (F), a thermoplastic elastomer composition comprising the thermoplastic vulcanized olefin elastomer (A)

composed of the (A-1), (A-2) and (F) components and the polyphenylene ether (C), or a thermoplastic elastomer composition comprising the thermoplastic vulcanized olefin elastomer (A) composed of the (A-1), (A-2) and (F) components, the polyphenylene ether (C), and the (F) component.

Here, the polyphenylene ether (C) component is a component for imparting heat resistance. The proportion of the (C) component is preferably 1 to 99 parts by weight, more preferably 5 to 90 parts by weight, most preferably 10 to 80 parts by weight based on the total 100 parts by weight of the (A), (C) and (F) components.

The (F) component according to the invention is an aromatic vinyl block copolymer composed of a block copolymer having an aromatic vinyl block and a conjugated diene block or a hydrogenated product thereof.

The block copolymer is a block copolymer composed of an aromatic vinyl unit and a conjugated diene unit, or a block copolymer in which the above conjugated diene unit part is partially hydrogenated or optionally modified by an unsaturated carboxylic acid or its anhydride or an epoxy compound.

The amount of the aromatic vinyl unit is preferably 10 to 90% by weight, more preferably 20 to 80% by weight, most preferably 30 to 70% by weight based on the block copolymer.

The above-described block structure is preferably a linear block copolymer represented by SB, S(BS)n (n is an integer of 1 to 3) or S(BSB)n (n is an integer of 1 to 2), or a star block copolymer shown by (SB)nX (n is an integer of 3-6 and X is a residue of a coupling agent such as silicon tetrachloride, tin tetrachloride or a polyepoxy compound) in which the B portion is a bonding center, with a proviso that the polymer block composed of the aromatic vinyl unit is expressed by S and the polymer block composed of the conjugated diene unit and/or the partially hydrogenated conjugated diene unit is expressed by B. Among them, preferred are linear block copolymers of diblock SB, triblock SBS and tetrablock SBSB.

The aromatic vinyl monomer unit and conjugated diene unit constituting the above block copolymer are the same monomers as those described in the section of the (B) component.

According to the invention, the proportion of the (F) component is preferably 1 to 50 parts by weight, more preferably 5 to 40 parts by weight, most preferably 10 to 30 parts by weight based on the total 100 parts by weight of the (A), (C) and (F) components.

As another application of the thermoplastic elastomer of the invention, there is the following composition which exhibits very high rubber characteristics. Thus, the composition is a thermoplastic elastomer composition comprising a thermoplastic vulcanized olefin elastomer (A) composed of an ethylene-α-olefin copolymer (A-1-1) consisting of ethylene, a 3C to 5C α-olefin, and an unsaturated bond-containing monomer, produced using a metallocene catalyst, an ethylene-α-olefin copolymer (A-1-2) containing ethylene and a 4C to 20C α-olefin, produced using a metallocene catalyst, and a thermoplastic non-vulcanizable polymer (A-2) as a rubber-modified polypropylene resin, an organic crystal nucleating agent, and/or a polyorganosiloxane having a kinematic viscosity of 5,000 centistokes or more at 25° C. as specified by JIS-K2410.

Here, a rubber-modified polypropylene resin such as the above-described block type polypropylene or polymerization-type polypropylene resin is preferably used as a (A-2) component. Particularly, the block type is preferable, and exhibits high mechanical strength because the molecular cutting of the polypropylene is suppressed in vulcanization with an organic peroxide. The rubber-modified polypropylene preferably has a melt flow rate of 0.01 to 2 g/10 minutes, more preferably 0.05 to 0.5 g/10 minutes (230° C., 2.16 kg load (0.212 Pa)).

The organic crystal nucleating agent is a crystal nucleating agent classified into a phosphate ester salt, a sorbitol, or a carboxylate salt as described above.

The polyorganosiloxane is that described above, and has a kinematic viscosity of 5,000 centistokes or more, preferably 10,000 centistokes or more, more preferably 60,000 centistokes or more at 25° C. as specified by JIS-K2410. The polyorganosiloxane is preferably added when the degree of vulcanization is preferably 50% or less, more preferably 30% or less, most preferably 10% or less in the vulcanizing reaction of the (A) component. When the above polyorganosiloxane is present in the vulcanizing reaction of the (A) component, shearing heat generation is suppressed owing to reduced friction and a high vulcanizing level can be achieved.

The composition of the invention may additionally contain an inorganic filler, plasticizer, organic or inorganic pigment, heat stabilizer, antioxidant, ultraviolet absorber, light stabilizer, flame retardant, silicone oil, antiblocking agent, foaming agent, antistatic agent, or antimicrobial agent in such an amount that its features are not deteriorated.

For producing the composition of the invention, general means used to manufacture conventional resin and rubber compositions, such as Banbury mixer, kneader, single screw extruder and twin screw extruder may be used. The twin screw extruder, in particular, is preferably used to attain effective dynamic vulcanization. The twin screw extruder is more suitable to disperse the (A-1) and (A-2) components uniformly and finely, to induce vulcanizing reaction by further adding other components and then to continuously produce the composition of the invention by adding the (B) component.

As a specific preferred example, the composition of the invention can be produced through the following manufacturing process. Thus, the (A-1) and (A-2) components are charged into an extruder hopper after blending well. The (E) component may be added either at initial stage together with the (A-1) and (A-2) components or from a middle feed section of the extruder. Alternatively, part of the (A-1) and (E) components may be added from a middle feed section of the extruder. The composition of the invention can be obtained by subjecting the (A) and (E) components to vulcanizing reaction in heat melting and kneading in an extruder, followed by adding other components such as the (B) component before melt kneading.

A preferable method for producing the composition of the invention is a method which comprises melt mixing the (A-1) and (A-2) components, followed by vulcanization using the (E) component.

As a melt extruder, a twin screw extruder having a length, L, from a feed section for raw materials to die and an L/D of 5 to 100 (D is the barrel diameter) is used. A preferable twin screw extruder has plural feed sections, that is, a main feed section and a side feed section, at different lengths from the extruder tip, and kneading zones between these feed sections and between the tip and the feed section locating closer to the tip, wherein the length of each kneading zone is from 3D to 10D.

The twin screw extruder as one of the production units used in the invention may be a co-rotating type or a counter rotating screw type. The screw type may also be any of non-intermeshing, partially intermeshing and complete intermeshing types. A counter rotating and partial intermeshing type screw is preferable for the case of obtaining a uniform resin under low shear force at low temperature. For the case of requiring kneading under somewhat high shear force, a co-rotating and complete intermeshing type screw is preferable. For the case of requiring kneading under further higher shear force, a co-rotating and complete intermeshing type screw is preferable.

The thermoplastic polymer composition thus obtained can be used to produce various moldings using any molding method. Injection molding, extrusion molding, compression molding, blow molding, calendaring, foaming, or the like is preferably used.

The composition of the invention is a modifier composition useful as a modifier for a thermoplastic polymer (corresponding to the constituent (C) of the invention) containing functional groups selected from oxygen-, nitrogen- and sulfur-containing functional groups. By way of specific example, the composition is excellent in the effect of modifying a thermoplastic polymer such as polyurethane, polystyrene, polyphenylene ether, polyalkylene ether, polyolefin, polyvinyl chloride, polyamide, polyester, polyphenylene sulfide, polycarbonate, or polymethacrylate, or a mixed polymer of two or more kinds. The composition is preferably used as a modifier for, among others, a thermoplastic polyurethane and/or a polymer composed of an unsaturated nitrile monomer unit and an aromatic vinyl monomer unit, a polyphenylene ether, and a polycarbonate. Particularly, the composition is preferably used as a modifier for a thermoplastic polyurethane and/or a polymer composed of an unsaturated nitrile monomer unit and an aromatic vinyl monomer unit.

The thermoplastic elastomer composition of the invention is excellent in compatibility with thermoplastic polymers and in rubber characteristics.

The composition of the invention can be widely used for applications including automotive materials such as automotive parts, automotive interior materials, and air bag covers, machine components, electrical parts, cables, hoses, belts, toys, miscellaneous goods, daily necessaries, construction materials, sheets and films. As a molding material, the composition is useful for foaming materials, calendering materials, powder slush molding materials, multilayer molding materials, insert molding materials, coextrusion molding materials, injection molding materials, blow molding materials, sheet extrusion materials, extrusion profile materials, and fiber-reinforced molding materials. Specific examples thereof are wallpapers, sealing materials, edge materials, waterproof sheets, tubing materials, wire coating materials, antislipping materials, cushioning materials, articles for swimming, and floor-covering materials, suggesting that the role of the composition in the industry is large.

DETAILED DESCRIPTION OF THE PREFERRED ILLUSTRATIVE ASPECTS

The present invention is described below in further detail with reference to Examples and Comparative Examples. However, the invention is not intended to be limited thereto. Test methods used for evaluating various physical properties in Examples and Comparative Examples are as follows.

1. Hydrogenation Ratio (%) of the (B) Component

The hydrogenation ratio is determined using a conventional NMR method.

2. Tensile Strength at Break (MPa)

The tensile strength at break is evaluated at 23° C. according to JIS K6251.

3. Adhesiveness to Different Thermoplastic Polymers

ABS resin, polypropylene resin, or polystyrene resin is used as a different kind of thermoplastic polymer for injection molding to prepare an insert in the form of a shift knob for automobile. A shift knob for automobile having a molding of a different kind of thermoplastic polymer in the inner layer and each of various thermoplastic elastomer compositions of the present application in the outer layer is molded using a vertical insert injection molding machine, Model TSD-SE manufactured by Nissei Plastic Industrial Co., Ltd. The thickness of the thermoplastic elastomer composition in the insert molding is 1 mm.

A heat shock test is conducted using 10 of the insert moldings. The testing conditions are as follows: cooling at −40° C. for one hour and heating at 130° C. for one hour form one cycle, and the cycle is repeated 100 times. Thereafter, the incidence of failures on 10 portions of a weld line is determined and used as a measure of adhesiveness. A smaller incidence of failures shows more excellent adhesiveness.

4. Rubber Characteristics (Recovery Angle)

A 2-mm thick sheet is bent to 180 degree in an atmosphere of 23° C. or 100° C., and placed, in this state, on a horizontal plane. A 1-kg weight is put thereon for 10 seconds before removal, the sheet is then allowed to unfold sufficiently, and the angle between the horizontal plane and the bent sheet is determined and defined as a recovery angle. A smaller recovery angle shows higher recoverability and higher rubber characteristics.

A cushioning feeling when the sheet is pressed by a finger is used as a measure of rubber characteristics, and the evaluation thereof is performed using the following criteria.

A: Excellent

B: Good

C: good, but slightly hard

D: hard and giving no cushioning feeling

5. Degree of Vulcanization

The weight (W0) of the (A) component in the composition is measured in advance and the composition is then refluxed in 200 ml of xylene for 20 hours before filtering the solution through a filter, followed by vacuum drying the filtrate at 100° C. before measuring the weight (W1) thereof. The degree of vulcanization is calculated as follows:

$$\text{Degree of vulcanization} = (W1/W0) \times 100(\%).$$

The components used in Examples and Comparative Examples are as follows.

(I) Ethylene-α-olefin Copolymers (A-1)

(a) Copolymer of ethylene and octene-1 (TPE-1)

The copolymer of ethylene and octene-1 is produced by a method using a metallocene catalyst as described in Japanese Patent Laid-Open No. 03-163088. The copolymer has a composition ratio of ethylene/octene-1 of 72/28 (weight ratio). (This copolymer is referred to as TPE-1).

(b) Copolymer of ethylene and octene-1 (TPE-2)

The copolymer of ethylene and octene-1 is produced by a method using a conventional Ziegler catalyst. The copolymer has a composition ratio of ethylene/octene-1 of 72/28 (weight ratio). (This copolymer is referred to as TPE-2).

(c) Ethylene-propylene-ethylidene norbornene (ENB) copolymer (TPE-3)

The copolymer is produced by a method using a metallocene catalyst as described in Japanese Patent Laid-Open No. 03-163088. The copolymer has a composition ratio of ethylene/propylene/ENB of 72/24/4 (weight ratio) and a Mooney viscosity of 100. (This copolymer is referred to as TPE-3).

(II) Thermoplastic Non-Vulcanizable Polymers (A-2)

(a) Thermoplastic Polymers (C) Containing Functional Groups Selected from Oxygen-, Nitrogen- and Sulfur-Containing Groups (1) Thermoplastic Polyurethane (TPU)

This is a commercially available thermoplastic polyurethane composed of polytetramethylene adipate, 4,4'-diphenylmethane diisocyanate, and 1,4-butanediol (referred to as TPU).

(2) Acrylonitrile (A)/Styrene (S) Copolymer (AS)

A/S=30/70 (weight ratio). (This is referred to as AS).

(3) Polyphenylene Ether

The polyphenylene ether is poly(2,6-dimethyl-1,4-phenylene ether) (referred to as PPE) and has a reduced viscosity $\eta sp/C$ (0.5 g/dl, chloroform solution, measurement at 30° C.) of 0.50 dl/g.

(4) Polycarbonate (PC)

The polycarbonate is bisphenol A type polycarbonate (referred to as PC).

(5) Polyalkylene Ether (POM)

The polyalkylene ether is polyoxymethylene (referred to as POM).

(6) Polyester (PBT)

The polyester is polybutylene terephthalate (referred to as PBT).

(7) Polyamide (PA)

The polyamide is polyamide 6 (referred to as PA).

(b) Olefin Resins (1) Isotactic homopolypropylene (referred to as h-PP (0.5)); MFR: 0.5 g/10 minutes (230° C., 2.16 kg load)

(2) Isotactic block polypropylene (referred to as b-PP (0.5)); MFR: 0.5 g/10 minutes (230° C., 2.16 kg load)

(3) Isotactic block polypropylene (referred to as b-PP (2)); MFR: 2 g/10 minutes (230° C., 2.16 kg load)

(4) Isotactic block polypropylene (referred to as b-PP (3)); MFR: 3 g/10 minutes (230° C., 2.16 kg load)

(5) Isotactic block polypropylene (referred to as b-PP (10)); MFR: 10 g/10 minutes (230° C., 2.16 kg load)

(c) Aromatic Vinyl Resin

The aromatic vinyl resin is rubber-unmodified polystyrene (referred to as PS). MFR: 0.5 g/10 minutes (230° C., 2.16 kg load)

(III) Hydrogenated Copolymer Rubbers (a) Random Type (B)

A hydrogenated random copolymer is produced by hydrogenating a styrene-conjugated diene random copolymer, based on a method as described in WO01/48079. The precursor copolymer has a composition ratio of styrene/butadiene of 70/30 (weight ratio) and a Mooney viscosity of 100. The hydrogenation ratio thereof is 95%, and the random/block ratio of styrene is 100/0. (The resultant copolymer is referred to as H-SBR-1).

In addition, a copolymer consisting of the above-described copolymer whose random/block ratio of styrene is changed into 90/10 or 100/0 is produced. (The resultant copolymers are referred to as H-SBR-2 and SEBS-1, respectively).

Further, a similar random type copolymer is produced by changing the butadiene of the above-described precursor copolymer into isoprene. The resultant copolymer has a random/block ratio of styrene of 100/0. (This is referred to as H-SIR).

(b) Block Type (1) SEBS-2 (F)

A block type hydrogenated conjugated diene rubber obtained by completely hydrogenating a commercially available styrene (S)-butadiene (B) block copolymer (S/B=60/40 (weight ratio)) (referred to as SEBS-2).

(2) SEPS (F)

A block type hydrogenated conjugated diene rubber obtained by completely hydrogenating a commercially available styrene (S)-isoprene (I) block copolymer (S/I=60/40 (weight ratio)) (referred to as SEPS).

(3) Block Copolymers (D)

Hydrogenated Styrene-Isoprene Block Copolymer and Polyurethane Block Copolymer (SU)

The production is carried out by a production method as described in Japanese Patent Laid-Open No. 2002-179906. Thus, a hydrogenated product of a triblock copolymer consisting of a polystyrene block-polyisoprene block-polystyrene block having a hydroxyl group in one end thereof (polystyrene: 30% by weight) and a polyurethane composed of polytetramethylene adipate, 4,4-diphenylmethane diisocyanate, and 1,4-butanediol are extruded at 220° C. using a twin screw extruder to prepare a pellet. (The resultant is referred to as SU).

Hydrogenated Styrene-Isoprene Block Copolymer and Polycarbonate Block Copolymer (SP)

The same experiment for the production of SU is repeated except for the use of a polycarbonate having bisphenol A in both ends in place of polyurethane. (The resultant is referred to as SP).

(IV) Vulcanizing Agents (E)

(a) Vulcanizing Initiator (E-1)

An organic peroxide, 2,5-dimethyl-2,5-bis(t-butylperoxy) hexane (referred to as POX)

(b) Polyfunctional Monomer (E-2)

A trifunctional monomer, triallyl isocyanurate (referred to as TAIC)

(V) Additives (a) Softener

Paraffin oil (referred to as MO)

(b) Organic Crystal Nucleating Agent

Sodium 2,2'-methylenebis(4,6-di-t-butylphenyl) phosphate (referred to as CA)

(c) Polyorganosiloxanes (1) Polydimethylsiloxane (kinematic viscosity at 25° C. as specified by JIS-K2410: 100 centistokes). (referred to as SI-1)

(2) Polydimethylsiloxane (kinematic viscosity at 25° C. as specified by JIS-K2410: 5,000 centistokes). (referred to as SI-2)

(3) Polydimethylsiloxane (kinematic viscosity at 25° C. as specified by JIS-K2410: 50,000 centistokes). (referred to as SI-3)

EXAMPLES 1 TO 53 AND COMPARATIVE EXAMPLES 1 TO 5

The compositions described in Tables 1 to 4 are each produced by melt extrusion under the temperature condition of 200° C. using a twin screw extruder (40 mm$\phi$, L/D=47) equipped with a feeding port at the barrel center. A two-thread screw having kneading zones at the front and back of the feeding port is used.

From each of the compositions thus obtained, a 2-mm thick sheet is prepared at 200° C. using an injection molding machine and subjected to various evaluations.

The results are shown in Tables 1 to 5.

TABLE 1

| | | | Ex. 1 | Comp. Ex. 2* | Ex. 1 | Comp. Ex. 3* | Ex. 2 | Ex. 4 | Ex. 5 | Comp. Ex. 3 | Ex. 6 | Ex. 7 | Ex. 8 |
|---|---|---|---|---|---|---|---|---|---|---|---|---|---|
| Compositions | (A) | Parts by weight | 50 | 50 | 50 | 50 | 50 | 50 | 50 | 50 | 50 | 50 | 50 |
| | | (A-1) Parts by weight | 50 | 50 | 50 | 50 | 50 | 50 | 50 | 50 | 50 | 50 | 50 |
| | | (Type) | (TPE-1) | (TPE-1) | (TPE-1) | (TPE-1) | (TPE-1) | (TPE-2) | (TPE-3) | (TPE-1) | (TPE-1) | (TPE-1) | (TPE-3) |
| | | (A-2) Parts by weight | 50 | 50 | 50 | 50 | 50 | 50 | 50 | 50 | 50 | 50 | 50 |
| | | (Type) | (h-PP(0.5)) | (h-PP(0.5)) | (h-PP(0.5)) | (h-PP(0.5)) | (h-PP(0.5)) | (h-PP(0.5)) | (h-PP(0.5)) | (h-PP(0.5)) | (h-PP(0.5)) | (h-PP(0.5)) | (h-PP(0.5)) |
| | | (E) POX/TAIC | 1/2 | 1/2 | 0/0 | 1/2 | 1/2 | 1/2 | 1/2 | 1/2 | 1/2 | 1/2 | 1/2 |
| | | MO | 0 | 0 | 0 | 0 | 0 | 0 | 0 | 0 | 0 | 0 | 0 |
| | (B) | Parts by weight | 50 | 50 | 50 | 25 | 0 | 50 | 50 | 50 | 50 | 25 | 25 |
| | | Hydrogenation ratio (%) | 95 | 95 | 95 | 95 | 95 | 95 | 95 | 95 | 95 | 95 | 95 |
| | | Composition before hydrogenation — Styrene/butadiene ratio | 70/30 | 70/30 | 70/30 | 70/30 | 70/30 | 70/30 | 70/30 | 70/30 | 70/30 | 70/30 | 70/30 |
| | | Styrene/isoprene ratio | — | — | — | — | — | — | — | — | 70/30 | — | — |
| | | Styremic chain | Random (H-SBR-1) | Random (H-SBR-1) | Random (H-SBR-1) | Random (H-SBR-1) | Random (H-SBR-1) | Random (H-SBR-1) | Random (H-SBR-1) | Block (SEBS-1) | Random (H-SIR) | Random (H-SBR-1) | Random (H-SBR-1) |
| | (C) | Parts by weight (Type) | 50(AS) | 50(AS) | 50(AS) | 50(AS) | 50(AS) | 50(AS) | 50(AS) | 50(AS) | 50(AS) | 50(AS) | 50(AS) |
| | (D) | Parts by weight (Type) | 0 | 25(SU) | 0 | 25(SU) | 50(SU) | 0 | 0 | 0 | 0 | 25(SP) | 25(SU) |
| | (E) | Parts by weight (Type) | 0 | 0 | 0 | 0 | 0 | 0 | 0 | 0 | 0 | 0 | 0 |
| | | Additive | 0 | 0 | 0 | 0 | 0 | 0 | 0 | 0 | 0 | 0 | 0 |
| Evaluation | Rubber characteristics | Recovery angle (23° C.) | 8 | 3 | 43 | 5 | 33 | 13 | 9 | 24 | 7 | 9 | 8 |
| | | Cushioning feeling | B | A | D | A | D | B-C | B | D | B | B | B |
| | Adhesiveness to ABS resin (Number of failures/10 portions) | | 3 | 1 | 3 | 1 | 7 | 5 | 3 | 4 | 3 | 3 | 3 |

*It shows a more preferred example.

TABLE 2

| | | | Ex. 9 | Ex. 10* | Ex. 11* | Ex. 12 | Ex. 13* | Ex. 14* | Ex. 15 |
|---|---|---|---|---|---|---|---|---|---|
| Compositions | (A) | Parts by weight | 50 | 50 | 50 | 50 | 50 | 50 | 50 |
| | | (A-1) Parts by weight | 50 | 50 | 50 | 50 | 50 | 50 | 50 |
| | | (Type) | (TPE-1) | (TPE-1) | (TPE-1) | (TPE-1) | (TPE-1) | (TPE-1) | (TPE-1) |
| | | (A-2) Parts by weight (Type) | 50(AS) | 50(AS) | 50(AS) | 50(TPU) | 50(TPU) | 50(TPU) | 50(PP) |
| | | (E) POX/TAIC | 1/2 | 1/2 | 1/2 | 1/2 | 1/2 | 1/2 | 1/2 |
| | | MO | 0 | 0 | 0 | 0 | 0 | 0 | 0 |
| | (B) | Parts by weight | 50 | 50 | 25 | 50 | 50 | 25 | 50 |
| | | Hydrogenation ratio (%) | 95 | 95 | 95 | 95 | 95 | 95 | 95 |
| | | Composition before hydrogenation — Styrene/butadiene ratio | 70/30 | 70/30 | 70/30 | 70/30 | 70/30 | 70/30 | 70/30 |
| | | Styrene/isoprene ratio | — | — | — | — | — | — | — |
| | | Styremic chain | Random (H-SBR-1) | Random (H-SBR-1) | Random (H-SBR-1) | Random (H-SBR-1) | Random (H-SBR-1) | Random (H-SBR-1) | Random 90/Block 10 (H-SBR-2) |
| | (C) | Parts by weight (Type) | 50(AS) | 50(AS) | 50(AS) | 50(AS) | 50(AS) | 50(AS) | 50(AS) |
| | (D) | Parts by weight (Type) | 0 | 25(SU) | 25(SU) | 0 | 25(SU) | 25(SU) | 0 |
| | (E) | Parts by weight (Type) | 0 | 0 | 0 | 0 | 0 | 0 | 0 |
| | | Additive | 0 | 0 | 0 | 0 | 0 | 0 | 0 |
| Evaluation | Rubber characteristics | Recovery angle (23° C.) | 13 | 7 | 9 | 10 | 5 | 6 | 11 |
| | | Cushioning feeling | B | A | B-A | B | A | A-B | B |
| | Adhesiveness to ABS resin (Number of failures/10 portions) | | 1 | 0 | 1 | 1 | 0 | 0 | 4 |

| | | | Ex. 16 | Ex. 17 | Ex. 18 | Ex. 19 | Ex. 20 | Ex. 21 |
|---|---|---|---|---|---|---|---|---|
| Compositions | (A) | Parts by weight | 50 | 50 | 50 | 50 | 50 | 50 |
| | | (A-1) Parts by weight | 50 | 50 | 50 | 50 | 50 | 50 |
| | | (Type) | (TPE-1) | (TPE-1) | (TPE-1) | (TPE-1) | (TPE-1) | (TPE-1) |

TABLE 2-continued

|  |  |  |  |  |  |  |  |  |
|---|---|---|---|---|---|---|---|---|
|  |  | (A-2) Parts by weight (Type) | 50(AS) | 50 (h-PP(0.5)) | 50 (h-PP(0.5)) | 50 (h-PP(0.5)) | 50 (h-PP(0.5)) | 50 (h-PP(0.5)) |
|  |  | (E) POX/TAIC | 1/2 | 1/2 | 1/2 | 1/2 | 1/2 | 1/2 |
|  |  | MO | 0 | 20 | 0 | 0 | 0 | 0 |
|  | (B) | Parts by weight | 50 | 50 | 25 | 25 | 25 | 25 |
|  |  | Hydrogenation ratio (%) | 95 | 95 | 95 | 95 | 95 | 95 |
|  |  | Composition before hydrogenation — Styrene/butadiene ratio | 70/30 | 70/30 | 70/30 | 70/30 | 70/30 | 70/30 |
|  |  | Styrene/isoprene ratio | — | — | — | — | — | — |
|  |  | Styremic chain | Random 90/Block 10 (H-SBR-2) | Random (H-SBR-1) | Random (H-SBR-1) | Random (H-SBR-1) | Random (H-SBR-1) | Random (H-SBR-1) |
|  | (C) | Parts by weight (Type) | 50(AS) | 50(AS) | 50(PC) | 50(POM) | 50(AS) | 50(PBT) |
|  | (D) | Parts by weight (Type) | 0 | 0 | 25(SP) | 25(SP) | 25(SP) | 25(SP) |
|  | (E) | Parts by weight (Type) | 0 | 0 | 0 | 0 | 0 | 0 |
|  |  | Additive | 0 | 0 | 0 | 0 | 0 | 0 |
| Evaluation | Rubber characteristics | Recovery angle (23° C.) | 14 | 11 | 8 | 9 | 6 | 8 |
|  |  | Cushioning feeling | B | B | A | A | A | A |
|  | Adhesiveness to ABS resin (Number of failures/10 portions) |  | 2 | 2 | 0 | 1 | 0 | 1 |

*It shows a more preferred example.

TABLE 3

|  |  |  | Comp. Ex. 4 | Ex. 22* | Ex. 23 | Comp. Ex. 5 | Ex. 24* | Ex. 25 | Ex. 26 |
|---|---|---|---|---|---|---|---|---|---|
| Compositions | (A) | Parts by weight | 100 | 100 | 100 | 100 | 100 | 100 | 100 |
|  | (A-1) | Parts by weight (Type) | 50 (TPE-1) | 50 (TPE-1) | 50 (TPE-1) | 50 (TPE-1) | 50 (TPE-1) | 50 (TPE-1) | 50 (TPE-1) |
|  | (A-2) | Parts by weight (Type) | 50(PS) | 50(PS) | 50(PS) | 50 (h-PP(0.5)) | 50 (h-PP(0.5)) | 50 (h-PP(0.5)) | 50 (h-PP(0.5)) |
|  |  | (E) POX/TAIC | 1/2 | 1/2 | 1/2 | 1/2 | 1/2 | 1/2 | 1/2 |
|  |  | (F) | 0 | 20 (SEBS-2) | 0 | 0 | 20 (SEBS-2) | 0 | 20 (SEPS) |
|  | (B) | Parts by weight | 0 | 0 | 0 | 0 | 0 | 0 | 0 |
|  |  | Hydrogenation ratio (%) | — | — | — | — | — | — | — |
|  |  | Composition before hydrogenation — Styrene/butadiene ratio | — | — | — | — | — | — | — |
|  |  | Styrene/isoprene ratio | — | — | — | — | — | — | — |
|  |  | Styremic chain | — | — | — | — | — | — | — |
|  | (C) | Parts by weight (Type) | 50(PPE) | 50(PPE) | 50(PPE) | 50(PPE) | 50(PPE) | 50(PPE) | 50(PPE) |
|  | (D) | Parts by weight (Type) | 0 | 0 | 0 | 0 | 0 | 0 | 0 |
|  | (E) | Parts by weight (Type) | 0 | 0 | 20(SEBS-2) | 0 | 0 | 20(SEBS-2) | 0 |
|  |  | Additive | 0 | 0 | 0 | 0 | 0 | 0 | 0 |
| Evaluation | Rubber characteristics | Recovery angle (23° C.) | 44 | 18 | 21 | 40 | 14 | 17 | 13 |
|  |  | (100° C.) | 97 | 39 | 43 | 93 | 27 | 30 | 28 |
|  |  | Cushioning feeling | D | B | B | D | A | B | A |
|  | Adhesiveness to PS resin (Number of failures/10 portions) |  | 6 | 0 | 1 | 8 | 0 | 1 | 0 |
|  | Tensile strength at break (MPa) |  | 7 |  |  |  |  |  |  |
|  | Classification |  | Elastomer | Elastomer | Elastomer | Elastomer | Elastomer | Elastomer | Elastomer |

|  |  |  | Ex. 27 | Ex. 28 | Ex. 29 | Ex. 30 | Ex. 31 | Ex. 32 | Ex. 33 |
|---|---|---|---|---|---|---|---|---|---|
| Compositions | (A) | Parts by weight | 100 | 100 | 100 | 100 | 100 | 100 | 100 |
|  | (A-1) | Parts by weight (Type) | 50 (TPE-2) | 50 (TPE-3) | 50 (TPE-2) | 50 (TPE-3) | 50 (TPE-1) | 50 (TPE-1) | 50 (TPE-1) |
|  | (A-2) | Parts by weight (Type) | 50(PS) | 50(PS) | 50 (h-PP(0.5)) | 50 (h-PP(0.5)) | 50(PS) | 50(PS) | 50(PS) |
|  |  | (E) POX/TAIC | 1/2 | 1/2 | 1/2 | 1/2 | 1/2 | 1/2 | 1/2 |
|  |  | (F) | 20 (SEBS-2) | 20 (SEBS-2) | 20 (SEBS-2) | 20 (SEBS-2) | 20 (SEBS-2) | 20 (SEBS-2) | 20 (SEBS-2) |
|  | (B) | Parts by weight | 0 | 0 | 0 | 0 | 0 | 0 | 0 |
|  |  | Hydrogenation ratio (%) | — | — | — | — | — | — | — |
|  |  | Composition before hydrogenation — Styrene/butadiene ratio | — | — | — | — | — | — | — |
|  |  | Styrene/ | — | — | — | — | — | — | — |

TABLE 3-continued

|  |  |  |  |  |  |  |  |  |
|---|---|---|---|---|---|---|---|---|
|  | isoprene ratio |  | — | — | — | — | — | — | — |
|  | Styremic chain |  | — | — | — | — | — | — | — |
|  | (C) Parts by weight (Type) | 50(PPE) | 50(PPE) | 50(PPE) | 50(PPE) | 200(PPE) | 500(PPE) | 1000(PPE) |
|  | (D) Parts by weight (Type) | 0 | 0 | 0 | 0 | 0 | 0 | 0 |
|  | (E) Parts by weight (Type) | 0 | 0 | 0 | 0 | 0 | 0 | 0 |
|  | Additive | 0 | 0 | 0 | 0 | 0 | 0 | 0 |
| Evaluation | Rubber character-istics | Recovery (23° C.) | 27 | 17 | 24 | 13 | — | — | — |
|  |  | angle (100° C.) | 48 | 37 | 23 | 26 | — | — | — |
|  |  | Cushioning feeling | B-C | B | B-C | A | — | — | — |
|  | Adhesiveness to PS resin (Number of failures/10 portions) | 3 | 0 | 2 | 0 | 0 | 0 | 0 |
|  | Tensile strength at break (MPa) |  |  |  |  | 25 | 33 | 48 |
|  | Classification | Elastomer | Elastomer | Elastomer | Elastomer | Resin | Resin | Resin |

*It shows a more preferred example.

TABLE 4

|  |  |  | Ex. |  |  |  |  |  |  |  |  |  |
|---|---|---|---|---|---|---|---|---|---|---|---|---|
|  |  |  | 34 | 35 | 36 | 37 | 38 | 39 | 40* | 41* | 42* | 43 |
| Compositions | (A) | Parts by weight | 100 | 100 | 100 | 100 | 100 | 100 | 70 | 100 | 100 | 100 |
|  |  | (A-1) Parts by weight (Type) | 50 (TPE-1) | 50 (TPE-2) | 50 (TPE-3) | 25/25 (TPE-3) (TPE-2) | 25/25 (TPE-3) (TPE-2) | 25 (TPE-1) | 50 (TPE-1) | 25/25 (TPE-1) (TPE-3) | 25/25 (TPE-1) (TPE-3) | 25/25 (TPE-1) (TPE-3) |
|  |  | (A-2) Parts by weight (Type) | 50 (b-PP(0.5)) | 50 (b-PP(0.5)) | 50 (b-PP(0.5)) | 50 (b-PP(0.5)) | 50 (b-PP(0.5)) | 50 (b-PP(0.5)) | 50 (b-PP(0.5)) | 50 (b-PP(0.5)) | 50 (b-PP(0.5)) | 50 (b-PP(0.5)) |
|  |  | (E) POX/TAIC | 1/2 | 1/2 | 1/2 | 1/2 | 1/2 | 1/2 | 1/2 | 1/2 | 1/2 | 1/2 |
|  |  | H-SBR-1/MO | 0/20 | 0/20 | 0/20 | 0/20 | 0/20 | 25/20 | 0/20 | 0/20 | 0/20 | 0/0 |
|  |  | Parts by weight (SI type) (Degree of vulcanization on addition (%)) | — | — | — | — | — | — | — | — | — | — |
|  | (B) | Parts by weight | 0 | 0 | 0 | 0 | 0 | 0 | 30 | 0 | 0 | 0 |
|  |  | Hydrogenation ratio (%) | — | — | — | — | — | — | 95 | — | — | — |
|  |  | Composition before hydrogenation Styrene/butadiene ratio | — | — | — | — | — | — | 70/30 | — | — | — |
|  |  | Styrene/isoprene ratio | — | — | — | — | — | — | — | — | — | — |
|  |  | Styremic chain | — | — | — | — | — | — | Random (H-SBR-1) | — | — | — |
|  | (C) Parts by weight (Type) | 0 | 0 | 0 | 0 | 0 | 0 | 0 | 0 | 0 | 0 |
|  | (D) Parts by weight (Type) | 0 | 0 | 0 | 0 | 0 | 0 | 0 | 0 | 0 | 0 |
|  | (E) Parts by weight (Type) | 0 | 0 | 0 | 0 | 0 | 0 | 0 | 0 | 0 | 0 |
|  | Additive | 0 | 0 | 0 | 0 | 1(CA) | 0 | 0 | 0 | 1(CA) | 1(CA) |
| Evaluation | Rubber character-istics | Recovery (23° C.) | 8 | 10 | 8 | 7 | 6 | 12 | 9 | 5 | 3 | 5 |
|  |  | angle (100° C.) | 19 | 21 | 18 | 13 | 12 | 25 | 17 | 14 | 9 | 12 |
|  |  | Cushioning feeling | B-C | C | B-C | B-C | B-C | B-C | B | B | A | A |
|  | Adhesiveness to PP resin (Number of failures/10 portions) | 3 | 4 | 3 | 3 | 3 | 3 | 2 | 1 | 0 | 0 |
|  | Tensile strength at break (MPa) | 7 | 5 | 8 | 7 | 8 | 6 | 7 | 10 | 13 | 16 |

*It shows a more preferred example.

TABLE 5

|  |  |  | Ex. |  |  |  |  |  |  |  |  |  |
|---|---|---|---|---|---|---|---|---|---|---|---|---|
|  |  |  | 44 | 45 | 46 | 47 | 48* | 49 | 50 | 51 | 52 | 53 |
| Compositions | (A) | Parts by weight | 100 | 100 | 100 | 100 | 100 | 100 | 100 | 100 | 100 | 100 |
|  |  | (A-1) Parts by weight (Type) | 25/25 (TPE-1)/(TPE-3) | 25/25 (TPE-1)/(TPE-3) | 25/25 (TPE-1)/(TPE-3) | 25/25 (TPE-1)/(TPE-3) | 25/25 (TPE-1)/(TPE-3) | 25/25 (TPE-1)/(TPE-3) | 25/25 (TPE-1)/(TPE-3) | 25/25 (TPE-1)/(TPE-3) | 25/25 (TPE-1)/(TPE-3) | 25/25 (TPE-1)/(TPE-3) |
|  |  | (A-2) Parts by weight (Type) | 50 h-PP(0.5) | 50 b-PP(2) | 50 b-PP(3) | 50 b-PP(10) | 50 b-PP(0.5) | 50 b-PP(0.5) | 50 b-PP(0.5) | 50 b-PP(0.5) | 50 b-PP(0.5) | 50 b-PP(0.5) |
|  |  | (E) POX/TAIC | 1/2 | 1/2 | 1/2 | 1/2 | 1/2 | 1/2 | 1/2 | 1/2 | 1/2 | 1/2 |
|  |  | H-SBR-1/MO | 0/20 | 0/20 | 0/20 | 0/20 | 0/20 | 0/20 | 0/20 | 0/20 | 0/20 | 0/20 |
|  |  | Parts by weight (SI type) (Degree of vulcanization on addition (%)) | — | — | — | — | 1(SI-3) (0%) | 1(SI-1) (0%) | 1(SI-2) (0%) | 1(SI-3) (30%) | 1(SI-3) (50%) | 1(SI-3) [80%] |
|  | (B) Parts by weight | 0 | 0 | 0 | 0 | 0 | 0 | 0 | 0 | 0 | 0 |

TABLE 5-continued

|  |  |  | Ex. | | | | | | | | | |
|---|---|---|---|---|---|---|---|---|---|---|---|---|
|  |  |  | 44 | 45 | 46 | 47 | 48* | 49 | 50 | 51 | 52 | 53 |
|  |  | Hydrogenation ratio (%) | — | — | — | — | — | — | — | — | — | — |
|  | Composition before hydrogenation | Styrene/butadiene ratio | — | — | — | — | — | — | — | — | — | — |
|  |  | Styrene/isoprene ratio | — | — | — | — | — | — | — | — | — | — |
|  | Styremic chain |  | — | — | — | — | — | — | — | — | — | — |
|  | (C) Parts by weight (Type) |  | 0 | 0 | 0 | 0 | 0 | 0 | 0 | 0 | 0 | 0 |
|  | (D) Parts by weight (Type) |  | 0 | 0 | 0 | 0 | 0 | 0 | 0 | 0 | 0 | 0 |
|  | (E) Parts by weight (Type) |  | 0 | 0 | 0 | 0 | 0 | 0 | 0 | 0 | 0 | 0 |
|  | Additive |  | 0 | 0 | 0 | 0 | 0 | 0 | 0 | 0 | 0 | 0 |
| Evaluation | Rubber characteristics | Recovery (23° C.) | 11 | 12 | 14 | 16 | 3 | 4 | 5 | 4 | 4 | 5 |
|  |  | angle (100° C.) | 19 | 19 | 21 | 23 | 11 | 12 | 14 | 12 | 11 | 12 |
|  |  | Cushioning feeling | B | B | B-C | C | A | A | B | A | B | B |
|  | Adhesiveness to PP resin (Number of failures/10 portions) |  | 2 | 2 | 3 | 3 | 0 | 0 | 1 | 1 | 2 | 2 |
|  | Tensile strength at break (MPa) |  | 5 | 6 | 4 | 3 | 13 | 12 | 10 | 12 | 10 | 9 |

What is claimed is:

1. A thermoplastic elastomer composition comprising:
   1) a thermoplastic vulcanized olefin elastomer (A),
   2) an aromatic vinyl random copolymer (B), and
   3) a block copolymer (D) having
      a) a thermoplastic block (1) composed of either a block copolymer having an aromatic vinyl block and a conjugated diene block, or a hydrogenated product thereof, and
      b) a thermoplastic block (2) of a thermoplastic polymer containing one or more functional groups selected from the group consisting of oxygen-containing functional groups, nitrogen-containing functional groups and sulfur-containing functional groups,
   wherein the (A) component is a thermoplastic vulcanized elastomer composed of an ethylene-α-olefin copolymer (A-1) and a thermoplastic non-vulcanizable polymer (A-2), and the (A) component is vulcanized by a vulcanizing agent (E),
   wherein the (A-1) component is an ethylene-α-olefin copolymer comprising ethylene and a $C_3$ to $C_{20}$ α-olefin, produced using a metallocene catalyst,
   wherein the (A-2) component is at least one thermoplastic non-vulcanizable polymer selected from the group of:
      a) a polyphenylene ether,
      b) an olefin resin, and
      c) an aromatic vinyl resin,
   wherein the (B) component is a hydrogenated copolymer rubber composed mainly of random bonding which has an olefinic double bond hydrogenation ratio of 50% or more and comprises 10 to 49% by weight of a conjugated diene monomer and 51 to 90% by weight of an aromatic vinyl monomer,
   wherein the (A) component consists of 1 to 99% by weight of the (A-1) component and 1 to 99% by weight of the (A-2) component based on 100% by weight of the (A) component,
   wherein the proportion of the (A) component is 1 to 99 parts by weight based on the total 100 parts by weight of the (A) and (B) components, and
   wherein the proportion of the (D) component is 1 to 100 parts by weight based on the total 100 parts by weight of the (A) and (B) components.

* * * * *